United States Patent [19]
Barr

[11] 3,834,570
[45] Sept. 10, 1974

[54] NURSING UNIT WITH IMPROVED PLASTIC LINER

[76] Inventor: Arthur C. Barr, 111 King St., Madison, Wis. 53703

[22] Filed: Feb. 7, 1973

[21] Appl. No.: 330,397

Related U.S. Application Data

[60] Continuation-in-part of Ser. No. 206,965, Dec. 10, 1971, abandoned, which is a division of Ser. No. 68,368, Aug. 31, 1970, Pat. No. 3,645,414, which is a continuation-in-part of Ser. No. 862,840, Oct. 1, 1969, Pat. No. 3,545,637, which is a continuation-in-part of Ser. No. 744,537, July 12, 1968, Pat. No. 3,471,050.

[52] U.S. Cl.................. 215/11 E, 206/390, 229/53
[51] Int. Cl. ............................................. A61j 9/04
[58] Field of Search ........ 215/11 E; 206/58, 56 AB; 229/53

[56] References Cited
UNITED STATES PATENTS

| 3,161,311 | 12/1964 | Boston | 215/11 E |
| 3,204,855 | 9/1965 | Boynton | 215/11 E X |

*Primary Examiner*—Donald F. Norton
*Attorney, Agent, or Firm*—Morsbach, Pillote & Muir

[57] ABSTRACT

An impervious baby bottle is provided with a plastic liner, a nursing nipple, and a retaining cap. The plastic liner has longitudinal ribs on its exterior surface which extend over the lip of the bottle. The ribs provide venting spaces between the lip and the liner to vent the area between the bottle and liner to atmosphere so the liner collapses as liquid is dispensed therefrom. Several embodiments of the plastic liner are shown.

12 Claims, 10 Drawing Figures

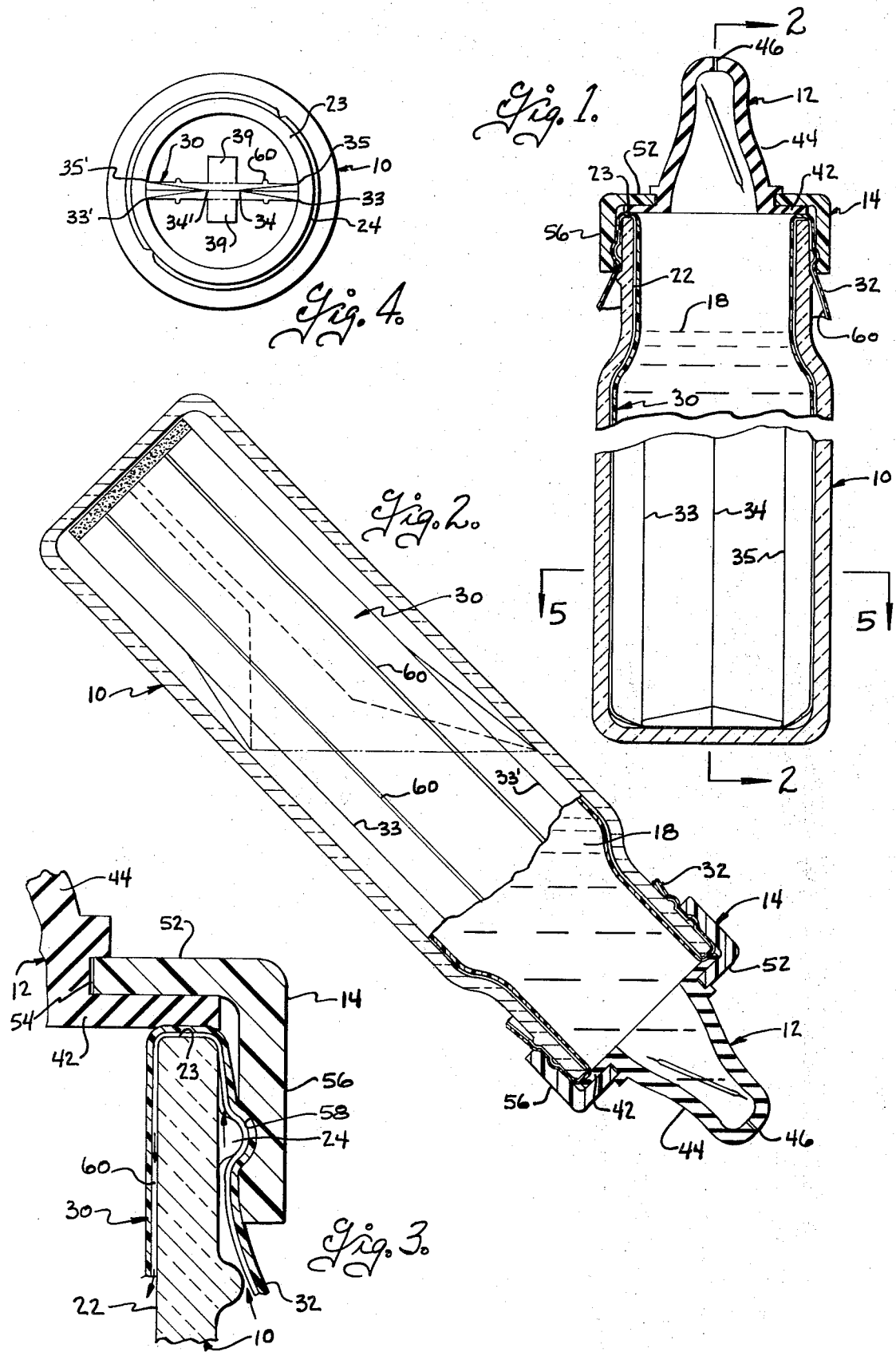

PATENTED SEP 10 1974 3,834,570

NURSING UNIT WITH IMPROVED PLASTIC LINER

CROSS-REFERENCE

This application is a continuation-in-part of copending application Ser. No. 206,965, filed Dec. 10, 1971, now abandoned; which was a division of application Ser. No. 68,368, filed Aug. 31, 1970, now U.S. Pat. No. 3,645,414; which was a continuation-in-part of application Ser. No. 862,840, filed Oct. 1, 1969, now U.S. Pat. No. 3,545,637; and which, in turn, was a continuation-in-part of application Ser. No. 744,537, filed July 12, 1968, now U.S. Pat. No. 3,471,050.

BACKGROUND

The invention pertains generally to bottles adapted for nursing; that is for dispensing liquid infant food.

The conventional baby nurser includes a reusable bottle, nipple and cap. It has the advantage of being reusable, but certain disadvantages when used with young infants. One chief disadvantage is the possibility of colic resulting from feeding air through the nipple. Nursing units having collapsible liners overcome this problem but, for the most part, are useless without the liners. Thus, should a mother run of liners at an inopportune time, a different nursing unit must be used. Other prior art arrangements have incorporated a plastic liner with a conventional nurser, for example see U.S. Pat. No. 2,624,485. These, however, do not overcome the disadvantages of the conventional nurser.

In my U.S. Pat. No. 3,471,050, issued Oct. 7, 1969, there is disclosed the combination of an impervious baby bottle, a plastic liner, a nursing nipple, a retaining cap, and a venting insert at the bottle mouth, between the lip and the liner, to vent the area between the bottle and the liner to atmosphere so the liner collapses as the liquid is dispensed. In my U.S. Pat. No. 3,545,637, issued Dec. 8, 1970, there is disclosed the combination of a nursing unit of the above type with an improved venting insert. My U.S. Pat. No. 3,645,414, issued Feb. 29, 1972, discloses an improved plastic liner in the above type of nursing unit. The three last-mentioned patents provide a venting insert in the total combination. While the venting function is imperative, it is desirable to eliminate the venting insert.

SUMMARY

The present invention relates generally to nursing units. More particularly, the present invention relates to a nursing unit which provides a collapsible liner in an impervious bottle.

It is a general object of the present invention to provide a nursing unit which has the advantages of both the conventional nurser and the collapsible nurser.

Another object is to provide a nursing unit which can be used as either a conventional nurser or a collapsible nurser.

Still another object of the present invention is to provide a nursing unit which utilizes a baby bottle and a flexible liner in the bottle, and provides apparatus for communicating the area between the liner and bottle to atmosphere so that the liner collapses as the liquid infant food is dispensed therefrom.

Yet another object of the present invention is to provide a nursing unit which provides for venting the area between a liner and a bottle to atmosphere, and yet achieves this function without any venting insert.

These, and other objects and advantages of the present invention, will become obvious as the invention becomes better understood from the following description when taken with the drawings.

DRAWINGS

FIG. 1 is generally a vertical sectional view, with part of the plastic liner in elevation, of a preferred embodiment of the present invention filled with a liquid infant food;

FIG. 2 is a vertical sectional view of the nursing unit taken along line 2—2 of FIG. 1, but in a dispensing position and illustrating the collapsing of the flexible liner as the liquid is dispensed;

FIG. 3 is a partial sectional view, on an enlarged scale, illustrating the relationship of the parts and the venting function in greater detail;

FIG. 4 is a top view of a bottle with the venting insert in place and having a plastic liner inserted through the bottle neck prior to applying;

DESCRIPTION

Figure 5:
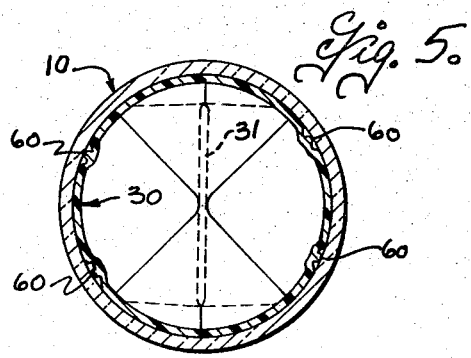
FIG. 5 is a cross-sectional view taken along the line 5—5 of FIG. 1 and showing how the plastic liner conforms to the bottle.

Reference is now made more particularly to the drawings which illustrate one form of the present invention and wherein similar reference characters indicate the same parts throughout the several views.

The nursing unit of the present invention includes a bottle 10, a nipple 12, and a retaining cap 14. The bottle 10 is preferably made of a strong, generally transparent material, such as glass or plastic, and which material is resistant to heat and impervious to liquid. In the embodiment illustrated, the bottle is of circular shape and of the eight-ounce size, it being understood that other sizes and shapes may be utilized. On the side of the bottle may be longitudinally positioned, spaced indicia or markings for determining the amount of liquid infant food 18 remaining in the unit. In the embodiment illustrated, the bottle is slightly necked at the top leaving a generally wide mouth 22 which terminates in a lip 23. The bottle lip 23 is preferably smooth and flat. As is conventional, the top of the bottle is circular in cross-section and provided with a screw thread 24 at the outside of the neck. Preferably, the thread 24 is discontinuous, as best seen in FIG. 3, for a purpose hereafter explained.

Received in the bottle 10 is a flexible liner 30 that is preferably impervious to liquid, being made of a strong, generally transparent, heat-resistant material, such as synthetic resin. The bottom edge of the liner or bag 30 is sealed at 31. The top of the liner is open and turned back over the top of the bottle as shown at 32. The length and diameter of the liner, when filled with the liquid infant food 18, is great enough to fill the entire bottle so that the indicia may serve to accurately indicate the true quantity of the contents in the liner. Additionally, by lying closely adjacent the walls of the bottle 30, heat is transmitted through the liner 30 to the liquid infant food 18 when the bottle is warmed.

The bag or liner 30 is formed from a plastic tube preferably by extruding a thermoplastic in the form of a hollow, tubular body. The tube is sterilized by supplying a fluid into the tubular body and which fluid is heated to a temperature sufficient for sterilization. The tube is maintained in the sterile condition through subsequent steps.

The tube is passed through jaws which tuck in the opposite sides of the tube to form reentrant folds 33–35 and 33'–35', as best shown in FIGS. 1 and 4. The folds at each side form two panels similar to those of a bellows as shown in FIG. 4. The tube thus constituted is flattened so as to bring these panels face-to-face and provide two flat outer sides. The flattening removes any of the sterilizing fluid from the tubular body. The tubular body is transversely heat sealed at spaced intervals to provide the seals 31. This provides a strip of integrally connected liners which are free from internal contamination.

Figure 6:
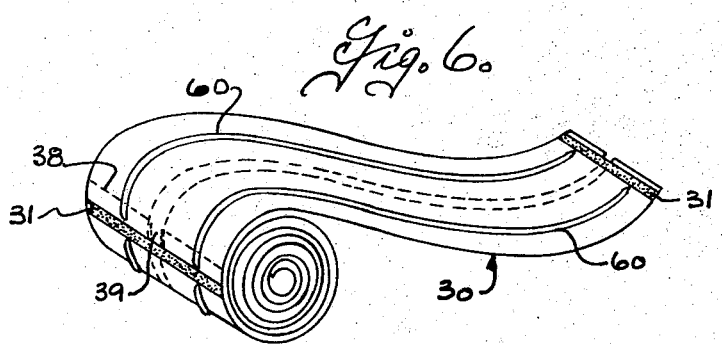
FIG. 6 is a perspective view of a roll of sterile liners manufactured in accordance with the present invention.

The strip of liners is perforated across its flattened width either in a straight line (not shown) or line 38 (FIG. 10) to facilitate detaching individual liners 30 from the strip. Line 38 is arranged to form tabs 39 at the extremity of the flat sides for a purpose explained in detail in my aforementioned U.S. Pat. No. 3,645,414. As seen in FIG. 6, the panels are spaced slightly apart to provide for the tabs 39.

An ordinary baby bottle, now available on the market, has a body with an effective inside diameter of about 1⅞ inches, an inside circumference of about 5.9 inches, and walls about ⅛ inch thick. Some of these have a reduced neck portion defining a mouth with about 1¼ inches inside diameter.

For use in the present invention it is preferable that the mouth be of a slightly smaller diameter than the body, so that the outside mouth diameter is no larger than the inside diameter of the body. In this manner, the liner 30 is easily turned down outside the bottle. At the same time, it is preferable that the inside diameter of the mouth be not less than one-quarter of the inside circumference of the body so that the flattened liner 30 can pass through the mouth without being folded. It will be understood, however, that the liner 30, constructed as described above, has distinct advantages even when used with existing baby bottles. The term "bottle" is meant to include glass or plastic bottles or holders in which plastic liners may be used.

As indicated above, the liner 30 preferably has reentrant folds and thus advantageously has a flattened width considerably less than one-half its peripheral width. Preferably the flattened width is in the range of one-quarter to one-third of the peripheral width. One-third is the preferred upper limit since it approximates the fraction one over pi ($\pi$). One-quarter is the preferred lower limit since it can be accomplished by the illustrated reentrant fold which gives four layers of plastic in flattened position. While additional folds and panels are possible, it complexes the manufacture and makes the sealing step difficult.

Overlying the liner 30 at the top lip 23 of the bottle, is the aforementioned nipple 12 which is held in place by the retaining cap 14. In general, the nipple 12 includes a peripheral flange 42 and a hollow teat portion 44 rising upwardly therefrom. The tip end of the nipple has an opening 46 for dispensing of the liquid infant food. The nipple illustrated is identical to that illustrated and described in U.S. Pat. No. 3,113,569 issued Dec. 10, 1963, to Arthur C. Barr and Norma K. Barr, and reference is made thereto for a more complete description thereof. It should be understood, however, that any conventional nipple may be utilized with the present invention.

The retaining cap 14 has an inwardly extending flange 52 with a circular opening 54. The flange 52 overlies the nipple flange 42 and the opening 54 permits the teat portion 44 to project therethrough. The cap 14 has a downturned annular flange 56 having an internal thread 58 which engages the bottle thread 24 to hold the cap in place. When the cap is tightly screwed down, a seal is provided between the nipple flange 42 and the liner 30.

In FIG. 1 the nursing unit is shown with the liner holding the liquid infant food. The weight of the liquid causes the liner to assume the shape of the bottle, as shown. As indicated above, the seal 31 has a length less than the diameter of the bottle body. In this manner, the seal can lie closely adjacent the bottom of the bottle 14. The weight of the liquid 18 will cause the liner 30 to assume the folds illustrated in FIG. 5 and conform to the bottom of the bottle while the panels lie against the sides of the bottle. Thus the liquid 18 generally fills the bottom of the bottle and there is little trapped air to insulate the liquid when being sterilized or heated.

In FIG. 2, the nursing unit is shown in a dispensing position with the liner 30 collapsed around the liquid. To allow the liner 30 to collapse, apparatus is provided for venting the area between the liner and the bottle 10 to atmosphere, to allow air into that area when the liquid is dispensed. In this manner, the dispensing through the opening 46 closely approximates the "natural" form of feeding. The liquid can be more easily withdrawn by a newborn baby, for example, than when the baby must draw a partial vacuum on the bottle as occurs in a conventional nurser. Additionally, with the collapse of the flexible liner 30, no flow of air into the liner is required thereby alleviating the possibility of colic.

Figure 7:
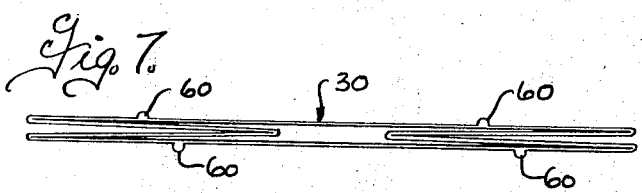
FIGS. 7–10 are each end views, on a greatly enlarged scale, of various embodiments of plastic bags manufactured in accordance with the present invention.

In accordance with the present invention, the venting apparatus is on the bag or liner 30. In the embodiment of FIGS. 1–7, the venting apparatus is in the form of a plurality of ribs 60, conveniently four in number. Each rib 60 extends the full length of the bag and is semicircular in cross-section, having a radius of about 0.015 inch to 0.020 inch, for example. The ribs are preferably integral with the bag; for example, the ribs are extruded simultaneously with the bag 30. As best shown in FIG. 7, the ribs are staggered when the bag is in flattened condition so that the roll (FIG. 6) is as compact as possible.

Referring now to FIG. 3, there is shown the bag 30 in place on the bottle 10, with the rib 60 extending over the bottle lip 23. The rib 60 provides a gap, or channel, on either side. These channels allow the passage of air from the outside of the bottle into the space between the line and the inside of the bottle, as shown by the arrows in FIG. 3. Air at atmospheric pressure can reach these channels by flowing between the threaded neck of the bottle and the downturned portion of the bag 30. To aid in this communication, the thread 24 is interrupted or discontinous, as shown in FIGS. 3 and 4, to provide an air passageway from the outside of the nursing unit to the aforementioned channels. Also, the threads 24 and 58 are arranged to provide air channels along the rib 60, if the rib extends that far. As can be seen, it is necessary that the rib 60 extend over the bottle lip 23. It is contemplated that the rib 60 can be of a length only sufficient to be properly positioned over the bottle lip; however, for convenience in manufacture, the rib 60 preferably extends the full length of the bag 30.

The nipple 12 is preferably formed of a material, such as rubber, of sufficient resilience to allow the flange 42 to deform in the area of the ribs 60 (see FIG. 3). The deformation must be sufficient to maintain a seal between the bag 30 and flange 42 even though the surface of the bag in the area of the lip 23 is irregular. The irregularity, of course, is caused by the aforedescribed air channels.

Should a consumer's supply of bags 30 become depleted, the bottle 10, nipple 12 and retaining cap 14 may be used in the ordinary manner to feed an infant. With the venting apparatus on the bag, the nursing unit is easily converted from an ordinary nurser to one with a collapsible liner. Thus, the construction of the present invention is far superior to the constructions shown in my aforementioned U.S. Pat. Nos. 3,471,050 and 3,545,637 for the following reasons: (1) no venting insert is required to provide a nurser with a collapsible liner (conversely, no such venting insert must be removed to use the unit as a conventional nurser); and (2) the bottle construction is simplified.

Figure 8:
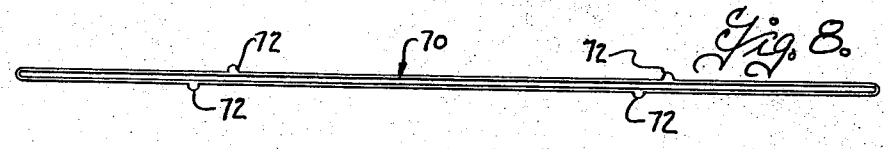
Figure 9:
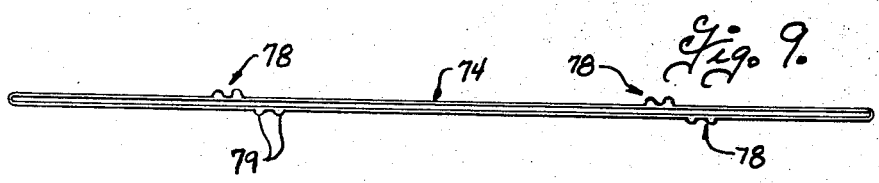
Figure 10:
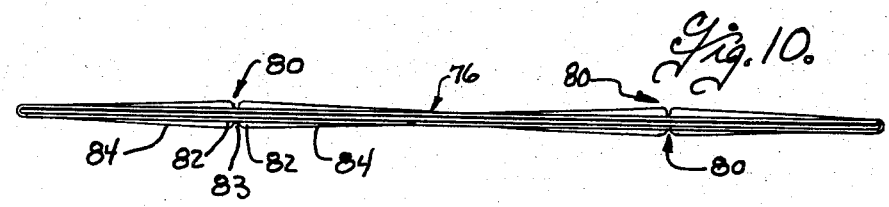

Other exemplary bag constructions are shown in FIGS. 8-10. In FIG. 8, a bag 70 is of flat construction of the type described in my aforementioned U.S. Pat. Nos. 3,471,050 and 3,545,637. The peripheral cross-section dimension is equal to that of previously described bag 30. A plurality of longitudinally-extending ribs 72, identical to ribs 60, are provided integral with bag 70.

In FIGS. 9 and 10, bags 74 and 76 are of flat construction of the type described above. Bag 74 has a plurality of longitudinally-extending rib means, generally designated 78. Each rib means 78 includes at least two parallel ribs 79 of similar size and shape as previously described rib 60. Each pair of ribs 79 is spaced apart a short distance, for example 0.030 inch to 0.040 inch, to provide an air channel therebetween. This gives added assurance of the venting function. Bag 76 has a plurality of longitudinally-extending rib means, generally designated 80. Each rib means 80 also includes two parallel ribs 82 providing an air channel 83 therebetween. On the side opposite the channel 83, each rib 82 has an integral ramp 84. This gives added assurance of the sealing between the flange 42 and the bag 76. If desired, three rib means 80 may be provided to allow a relatively compact roll of bags.

The invention in its broader aspects is not limited to the specific apparatus shown and described but departures may be made therefrom within the scope of the accompanying claims without departing from the principles of the invention and without sacrificing its chief advantages.

The embodiments of the invention in which an exclusive property or privilege is claimed are defined as follows:

1. A nursing unit for liquid infant food including, in combination:

an impervious, reusable bottle having an annular neck at the top and terminating in a peripheral lip defining an open mouth, and the bottle having an external annular recess at the lip;

a nursing nipple overlying the bottle mouth and lip;

a disposable, impervious plastic liner received in the bottle for holding the liquid infant food and having an upper portion extending over the bottle lip under the nursing nipple and turned downwardly outside the bottle neck, the plastic liner having a peripheral width approximating that of the internal circumference of the bottle and a length greater than the height of the bottle, and the plastic liner being closed at the bottom and open at the upper portion;

venting means on the outside of the plastic liner and integral therewith and extending over the bottle lip to provide a gap between the liner and the bottle lip for continuously venting the area between the bottle and liner to atmosphere so the liner collapses as the liquid infant food is dispensed therefrom; and a removable retaining cap overlying a portion of the nursing nipple for clamping the nursing nipple against the liner to provide a liquid-tight seal therebetween.

2. A nursing unit as set forth in claim 1 wherein the venting means comprises a longitudinally-extending rib integral with the plastic liner and extending over the bottle lip.

3. A nursing unit as set forth in claim 2 wherein there are a plurality of longitudinally-extending ribs spaced about the periphery of the plastic liner.

4. A nursing unit as set forth in claim 2 wherein the rib extends generally the full length of the plastic liner.

5. A nursing unit as set forth in claim 4 wherein the plastic liner has reentrant folds at each side so that its flattened width is considerably less than half its peripheral width to facilitate entry into the bottle mouth.

6. A nursing unit as set forth in claim 5 including a seal at the bottom of the plastic liner to close the same, the seal extending through the ribs and through the reentrant folds to hold the same in position.

7. In a nursing unit for liquid infant food including an impervious, reusable bottle having a neck at the top and terminating in a peripheral lip defining an open mouth; a nursing nipple overlying the bottle mouth; and mounting means for mounting the nursing nipple at the bottle mouth; the improvement comprising: a disposable, impervious liner received in the bottle for holding the liquid; at least one longitudinally-extending rib on the outside of the liner and attached thereto; the rib being arranged to extend over the bottle lip and provide a gap between the liner and bottle lip thereby venting the area between the bottle and liner to atmosphere so that the liner collapses as the liquid infant food is dispensed therefrom.

8. The combination of claim 7 wherein the rib is formed of the same material as the liner, is integral therewith, and extends the full length of the liner.

9. The combination of claim 8 wherein there are a pair of parallel ribs spaced apart to provide a longitudinal gap therebetween.

10. The combination of claim 9 wherein each rib has a tapering section on the side away from the longitudinal gap to merge the rib with the liner.

11. A continuous length of internally sterile, separable, flexible, and collapsible synthetic plastic liners; each liner, when separated from the length of liners being open at the top for use in a relatively stiff baby bottle having a circular open mouth with the liner being flexible to enable th top of the liner to be pulled out and down over the lip of the baby bottle; the liners also being imperforate for holding a quantity of liquid baby food to be dispensed through a nursing nipple attached to the baby bottle; the continuous length of liners comprising a flattened, elongated, thin, flexible plastic tube which is one-piece and seamless in the longitudinal direction; the flattened tube having flat outer sides and a crosswise periphery approximating the inside diameter of the baby bottle; a plurality of longitudinally-extending ribs on the outer surface of the tube and integral therewith; the ribs arranged to extend over the bottle lip and provide gaps between the liner and bottle lip thereby venting the area between the bottle and liner to atmosphere so that the liner collapses as the liquid baby food is dispensed therefrom; a series of transverse seals extending fully across the flattened width of the tube to define the individual liners; the transverse seals being spaced longitudinally a distance greater than the height of the baby bottle to provide sufficient length to be folded down over the lip of the bottle; transverse lines of localized weakening in the sides of the tubes; there being a single line of weakening between each pair of transverse seals and adjacent one of the seals; and the lines of weakening defining potential lines of detachment between adjacent liners.

12. A disposable plastic liner for use in a baby bottle; the liner being of the type which is sterile, flexible and collapsible, and arranged to be disposed with its top portion to be pulled out over the lip of the bottle and down alongside the neck of the bottle; the improvement comprising: a plurality of longitudinally-extending ribs on the outside of the top portion of the liner; and the ribs being arranged to extend over the bottle lip and provide an air gap between the liner and bottle lip; whereby the area between the bottle and liner is vented to atmosphere.

* * * * *